(12) United States Patent
Madocks

(10) Patent No.: US 10,989,343 B2
(45) Date of Patent: Apr. 27, 2021

(54) PUSH-TO-CONNECT AND PULL-TO-DISCONNECT QUICK COUPLING

(71) Applicant: General Plasma, Inc., Tucson, AZ (US)

(72) Inventor: John E. Madocks, Tucson, AZ (US)

(73) Assignee: General Plasma Inc., Tucson, AZ (US)

( * ) Notice: Subject to any disclaimer, the term of this patent is extended or adjusted under 35 U.S.C. 154(b) by 210 days.

(21) Appl. No.: 15/568,295

(22) PCT Filed: Apr. 25, 2016

(86) PCT No.: PCT/US2016/029105
§ 371 (c)(1),
(2) Date: Oct. 20, 2017

(87) PCT Pub. No.: WO2016/172666
PCT Pub. Date: Oct. 27, 2016

(65) Prior Publication Data
US 2018/0112808 A1    Apr. 26, 2018

Related U.S. Application Data

(60) Provisional application No. 62/152,818, filed on Apr. 24, 2015.

(51) Int. Cl.
*F16L 37/23*    (2006.01)
(52) U.S. Cl.
CPC .................................... *F16L 37/23* (2013.01)
(58) Field of Classification Search
CPC .............. F16L 37/23; Y10T 137/87957; Y10T 137/87965

USPC .................................................. 285/277, 316
See application file for complete search history.

(56) References Cited

U.S. PATENT DOCUMENTS

| | | | |
|---|---|---|---|
| 1,873,914 A | 8/1932 | Adams |
| 2,069,434 A | 2/1937 | Eastman |
| 2,092,116 A | 9/1937 | Hansen |
| 2,279,146 A | 4/1942 | Schneller |
| 2,297,548 A | 9/1942 | Fox et al. |
| 2,377,812 A | 6/1945 | Scheiwer |
| 2,428,637 A | 10/1947 | Scheiwer |

(Continued)

FOREIGN PATENT DOCUMENTS

| | | |
|---|---|---|
| CN | 202812595 | 3/2013 |
| DE | 2715395 | 10/1978 |

(Continued)

OTHER PUBLICATIONS

International Search Report and Written Opinion dated Jul. 22, 2016, issued in PCT Patent Application No. PCT/US2016/029105, 10 pages.

(Continued)

*Primary Examiner* — Zachary T Dragicevich
(74) *Attorney, Agent, or Firm* — Grossman Tucker Perreault & Pfleger PLLC

(57) ABSTRACT

A quick coupling for connecting fluid lines with one-handed push-to-connect and pull-to-disconnect operation is described. The quick coupling achieves this preferred functionality with a minimum number parts, the quick coupling having only one spring and one dynamic seal. In addition to fluid carrying applications the quick coupling can be used for tool holding and power transmission.

6 Claims, 3 Drawing Sheets

(56) References Cited

U.S. PATENT DOCUMENTS

| | | |
|---|---|---|
| 2,451,218 A | 10/1948 | Hengst |
| 2,473,973 A | 6/1949 | Scheiwer |
| 2,512,999 A | 6/1950 | Bruning |
| 2,521,701 A | 9/1950 | Earle et al. |
| 2,568,516 A | 9/1951 | Scheiwer |
| 2,643,140 A | 6/1953 | Scheiwer |
| 2,674,469 A | 4/1954 | Earle et al. |
| 2,797,110 A | 6/1957 | Covington |
| 2,860,893 A | 11/1958 | Clark |
| 2,898,797 A | 8/1959 | Bronstein |
| 2,941,835 A | 6/1960 | Musser |
| 3,032,359 A | 5/1962 | Cator |
| 3,112,767 A | 12/1963 | Cator |
| 3,138,393 A | 6/1964 | Livingston |
| 3,178,213 A | 4/1965 | Nelson |
| 3,276,799 A | 10/1966 | Moore et al. |
| 3,498,324 A | 3/1970 | Breuning |
| 3,674,051 A | 7/1972 | Stratman |
| 4,219,048 A * | 8/1980 | Ekman .............. F16L 37/23 |
| 4,249,572 A | 2/1981 | Shindelar et al. |
| 4,366,945 A | 1/1983 | Blaeuenstein |
| 4,924,909 A | 5/1990 | Wilcox |
| 4,974,635 A | 12/1990 | Hanus et al. |
| 5,211,197 A | 5/1993 | Marrison et al. |
| 5,255,714 A | 10/1993 | Mullins |
| 5,323,812 A * | 6/1994 | Wayne .............. F16L 37/23 |
| | | 285/316 X |
| 5,445,358 A | 8/1995 | Anderson |
| 5,540,250 A | 7/1996 | Mullins |
| 5,873,386 A | 2/1999 | Arosio |
| 6,916,008 B2 | 7/2005 | Noble et al. |
| 7,926,783 B1 | 4/2011 | Liu |
| 8,246,085 B2 | 8/2012 | Kitagawa |
| 8,251,606 B2 | 8/2012 | Blanchard |
| 8,303,000 B2 | 11/2012 | Liu |
| 8,469,406 B2 * | 6/2013 | Takahashi .............. F16L 37/23 |
| | | 285/316 |
| 2004/0016900 A1 * | 1/2004 | Kouda .............. F16L 37/23 |
| 2014/0076417 A1 * | 3/2014 | Lin .............. F16L 37/23 |

FOREIGN PATENT DOCUMENTS

| | | |
|---|---|---|
| EP | 3286477 | 1/2020 |
| JP | 57139706 | 9/1982 |
| JP | 59175783 | 11/1984 |
| JP | 07012693 | 3/1995 |
| JP | 09329285 | 12/1997 |

OTHER PUBLICATIONS

International Preliminary Report on Patentability dated Nov. 2, 2017, issued in PCT Patent Application No. PCT/US2016/029105, 9 pages.

* cited by examiner

PUSH-TO-CONNECT AND PULL-TO-DISCONNECT QUICK COUPLING

RELATED APPLICATIONS

This application is the National Stage of International Application No. PCT/US2016/029105 filed 25 Apr. 2016, which claims the benefit of U.S. Provisional Application Ser. No. 62/152,818, filed 24 Apr. 2015.

FIELD OF THE INVENTION

The present invention relates to quick couplings and particularly to quick couplings that can be both connected and disconnected quickly and easily by a simple, one-handed pushing and pulling motion respectively.

BACKGROUND

Quick connect and disconnect quick couplings are well known in the art. It is recognized that an important operational consideration is the ease of which a quick coupling can be connected and disconnected. For instance, a preferred connection operation is one where the operator simply pushes the male component into the female component to accomplish a locked, secure joint. This is commonly termed 'push-to-connect' and/or 'one-handed connection' operation. A preferred quick coupling disconnection is one where the quick coupling separates after the operator provides a satisfactory pull on an obvious and accessible part of the quick coupling. This is similarly termed 'pull-to-disconnect' and/or 'one-handed disconnection'. In the case of these 'one-handed' tetras, it is recognized that the quick coupling must be constrained while a male plug is pushed in or the quick coupling is disconnected. The term "one-handed" comes from the common case where the female socket is fixed in place.

Another important factor when considering an improved quick coupling is the simplicity of its design. Because such quick couplings are used in the field, in situations where rapid and easy actions can be the difference between success and failure and repairs or adjustments may need to be made, the more simple the design, the greater the ease of use, repair and efficacy of the quick coupling. Simplicity includes the number of parts in the quick coupling, the complexity in the actuating motions and the number of seals in places where relative movement occurs. These factors naturally bear on the cost and reliability of the quick coupling.

A number of quick couplings have been disclosed that recognized these ideal design goals and have, at least within the disclosure, succeeded in achieving them to varying degrees.

In U.S. Pat. No. 2,069,434, Eastman accomplishes a simple push-to-connect operation disclosing a device that has one spring and one dynamic seal. Disconnection however requires pushing the quick coupling barrel away while pulling on the male plug, thus requiring two hands to use. It will be understood that when two manipulations are needed to effect either connection or disconnection then that quick coupling operation, as is the case here, would be termed 'two-handed'.

In U.S. Pat. No. 2,279,146, Schneller similarly has a push-to-connect operation and also requires a two hands to disconnect, pushing the socket barrel away while pulling on the male plug. The Schneller disclosure requires two springs and one dynamic seal. It should be noted that the springs and seal counted do not include those relating to internal poppet mechanisms. The two springs and one seal in Schneller are required for the basic operation of connecting and disconnecting the quick coupling. It will be also understood that the term 'dynamic seal' refers to a seal where the sealing surfaces are moved relative to each other when connecting and disconnecting the quick coupling. Persons having ordinary skill in the art will understand that these moving or dynamic seals are more prone to wear and failure and therefore a quick coupling with only one dynamic seal is preferred.

In U.S. Pat. No. 2,377,812, Scheiwer achieves the goal of both push-to-connect and pull-to-disconnect, but does this by using two springs.

In U.S. Pat. No. 2,521,701, Earle, et al. discloses an outside collar and an internal sliding shuttle, somewhat reminiscent of the present invention; however, the elements are configured differently. 'Earle et al. requires the use of two hands to disconnect and uses a two spring design.

In U.S. Pat. No. 2,674,469, Earle, et al. has both push-to-connect and pull-to-disconnect functionality and uses only one spring and one dynamic seal; disadvantageously, the disclosed design requires that both the female socket and male plug comprise multiple metal parts. As explained above, and as is known by persons having ordinary skill in the art, in many uses, such coupling of compressed air lines, one socket on the air supply can support several pneumatic tools with male plugs. In this case, it would be preferable that the male plug be a simple one-piece part. Tool holding is another quick coupling application where a simple, one-piece male plug component is preferred.

In U.S. Pat. No. 3,112,767, Cator discloses both push-to-connect and pull-to-disconnect operation; disclosing a design with the moving parts on the male plug and having two springs and one dynamic seal.

Many other quick coupling device examples exist, however these other quick coupling examples function on similar principles to the above examples and often are directed toward specific internal valving and or special use adaptations.

Therefore there is a need for a push-to-connect and pull-to-disconnect quick coupling allowing one-handed operation to both connect and disconnect. This coupling also should have a minimum number of parts for simplicity, reliability and economy. In addition, the quick coupling should have a single piece male component to facilitate having multiple male parts for use with one female component.

SUMMARY OF THE INVENTION

The inventive quick coupling accomplishes both one-handed push-to-connect and one-handed pull-to-disconnect operation with a minimum number parts, the coupling having only one spring and one dynamic seal. The quick coupling comprises a female socket having an open end to receive a male plug. A collar around the female socket is slidable between a stable open position and a stable locked position. The collar open position puts the quick coupling device in a disconnected state and the collar locked position puts the quick coupling in a connected state.

The quick coupling is disconnected by manually sliding the collar toward the socket open end. The coupling is connected by pushing the male plug into the female socket. In pushing the plug into the socket, the collar automatically slides back to the locked position securing the male plug into the female socket. In these simple operations a single spring alternatively maintains the open position and locked position of the collar.

In a preferred embodiment, the quick coupling male plug has an O-ring for sealing and protection (when in the uncoupled state) purposes. In all embodiments, the push-to-connect and pull-to-disconnect operations can be accomplished using one hand, freeing the user to be holding or operating other equipment while being able to disconnect or reconnect the coupling.

BRIEF DESCRIPTION OF THE DRAWINGS

The present invention can be better understood with reference to the following drawings.

DETAILED DESCRIPTION OF THE ILLUSTRATIVE EMBODIMENT

Figure 1:
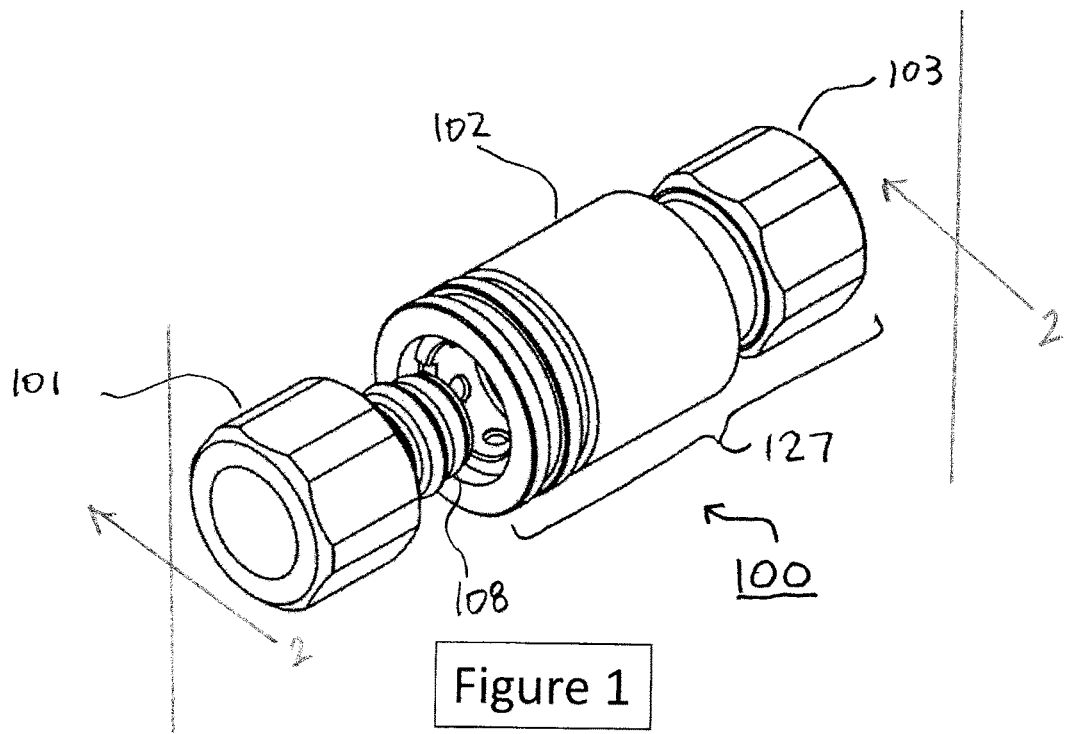
FIG. 1 is a perspective view of the quick connect/disconnect quick coupling of the present invention in the disconnected or open state.
Figure 2:
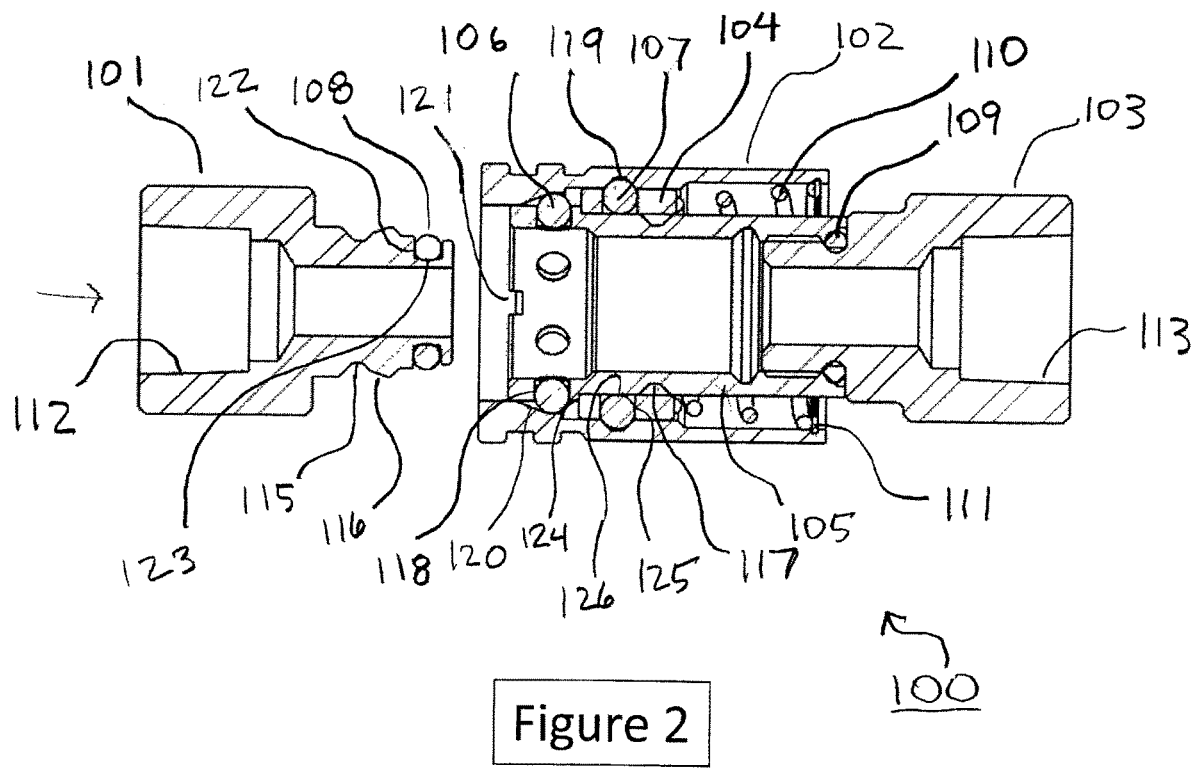
FIG. 2 is a cross-sectional side view of the quick coupling taken along line 2-2 of FIG. 1.

FIG. 1 shows a perspective view of the disconnected quick coupling 100 of the present invention. FIG. 2 shows a cross section view of this disconnected quick coupling 100. The female component 127 of quick coupling 100 is composed primarily of female socket 105, collar 102, shuttle 104 and socket cap 103. In a preferred embodiment, socket cap 103 screws into female socket 105 and static O-ring 109 reliably seals the joint between these two parts. Shuttle 104 is slidable onto female socket 105. In a preferred embodiment, shuttle 104 contains a set of six detent balls 107 evenly spaced around the diameter located in holes 125. Locking collar 102 slides on both the female socket 105 and the shuttle 104. Spring 110, inside collar 102, is compressed between collar retaining ring 111 and shuttle 104. Female socket 105 has holes 118 for a second set of detent balls 106. As will be understood by persons having ordinary skill in the art detent balls 107 and 106 can be replaced by cylindrical detents or detents of another shape. These detent balls are also referred to as detents.

In the disconnected state or open position, collar 102 is pulled forward as shown in FIGS. 1 and 2. Detent balls 107 are displaced into collar recess 119 and shuttle 104 is lodged against shoulder 124 on female socket 105. The spring 110 expansion force tends to wedge balls 107 between collar recess 119 and socket surface 126. This friction maintains the collar in the disconnected state.

Male plug 101 and socket cap 103 have interface connections, 112 and 113 respectively, to adapt the quick coupling 100 to other pipes or fittings. As will be understood by persons having ordinary skill in the art, these interface connections can be either tapered or straight threads, compression type fittings, direct weld connections or other known connection means, without departing from the novel scope of the present invention. Tapered pipe thread interface connections 112 and 113 are shown in the quick coupling of FIGS. 1-6.

In a preferred embodiment male plug 101, female socket 105 and socket cap 103 are constructed of stainless steel. These are the surfaces in contact with the gas or liquid inside quick coupling 100. For high purity gases and many other industrial processes, the chemical inertness and stability of stainless steel is desired. For other applications such as compressed air duty, other lower cost metals can be used for these parts. In a preferred embodiment, the locking collar 102 is also made of stainless steel as are detent balls 106 and 107, spring 110 and retaining ring 111; shuttle 104 is made of high tin bronze. Both high tin bronze and stainless steel are good materials for use inside vacuum chambers and allow the entire quick coupling 100 to be used inside a process vacuum chamber with minimal detrimental effect to the vacuum or process. Dynamic O-ring 108 and static O-ring 109 are preferably made of synthetic rubber and fluoropolymer elastomer, such as Viton®, but can also be any sealing material compatible with the application where the quick coupling is used.

Referring again to FIG. 2, quick coupling 100 has a single dynamic sealing O-ring 108 that is located in an O-ring groove 122 on male plug 101. This O-ring 108, being on male plug 101, protects the male plug sealing surface 123 from damage when the male plug 101 is loose, that is, not inserted in female socket 105. This is important when the quick coupling is used in a high vacuum application where a small scratch in the sealing surface will cause an intolerable leak. An additional advantage of having the primary dynamic seal on the male plug is that it is readily accessible for inspection and replacement.

Figure 3:
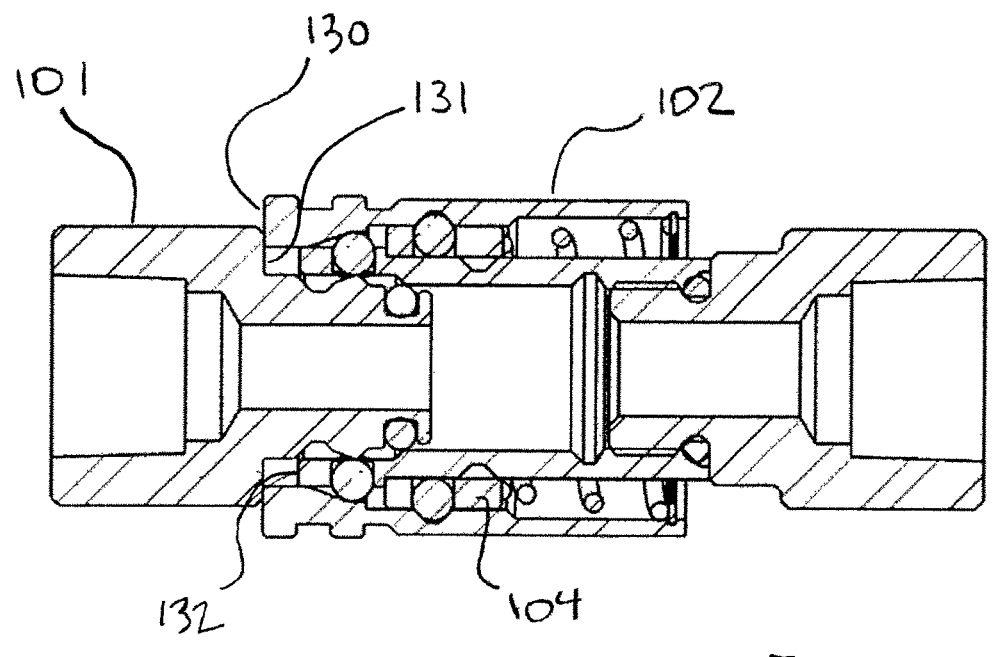
FIG. 3 is a cross-sectional view of the quick coupling taken along line 3-3 of FIG. 6, showing the male plug pushed in until it just contacts the collar.

FIG. 3 depicts the quick coupling 100, wherein male plug 101 is pushed into female socket 105 up to the point where plug shoulder 131 contacts collar face 130. At the position illustrated, no movement of collar 102 or shuttle 104 has occurred yet. This view is shown for overall quick coupling operation clarity.

Figure 4:
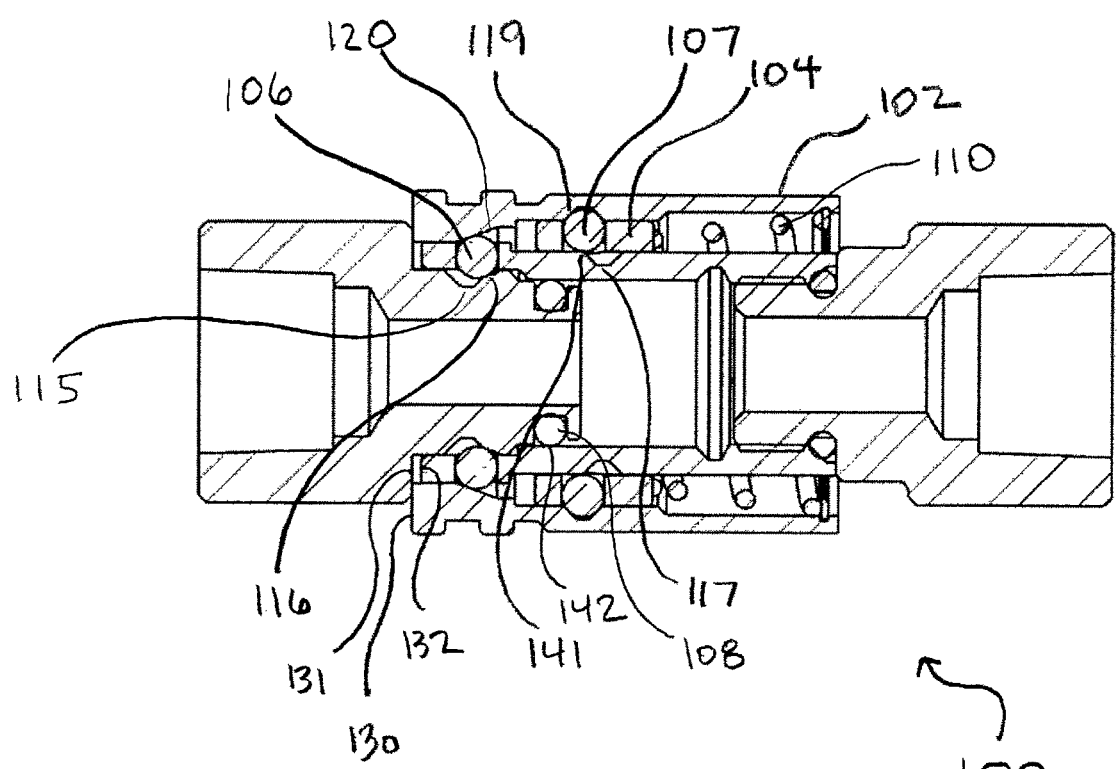
FIG. 4 is a modified cross-sectional view of FIG. 3 shown with the male plug pushed in showing the start of the action to lock the elements together.

In FIG. 4, male plug 101 has been pushed further into female socket 105. As this is transpires, plug shoulder 131 pushes on collar face 130 and collar 102 slides back on female socket 105. Shuttle 104 is then locked with collar 102 because detent balls 107 extend into recess 119 and slide back with collar 102. As collar 102 slides back, detent balls 106 encounter collar ramp 120 and detent balls 106 are forced down into plug ramp 116. It will be seen that plug ramp 116 parallels collar ramp 120.

When male plug 101 is pushed into female socket 105 to the position shown in FIG. 4, collar 102 is at the location where automatic closure and locking of the quick coupling will occur with further inward movement of male plug 101. In the position shown, collar 102 has been pushed back until detent balls 107 are at the edge 141 of socket recess 117. Once past edge 141, detent balls 107 can start to move down into socket recess 117. The expansion force caused by spring 110 is directed to push detent balls 107 out of collar recess 119. As detent balls 107 gain access to socket recess 117, the force of spring 110 pushes them out of collar recess 119 and into socket recess 117. Once this transition starts, it continues without further male plug 101 motion such that locking collar 102 toggles back to the locked position with an audible click.

Figure 5:
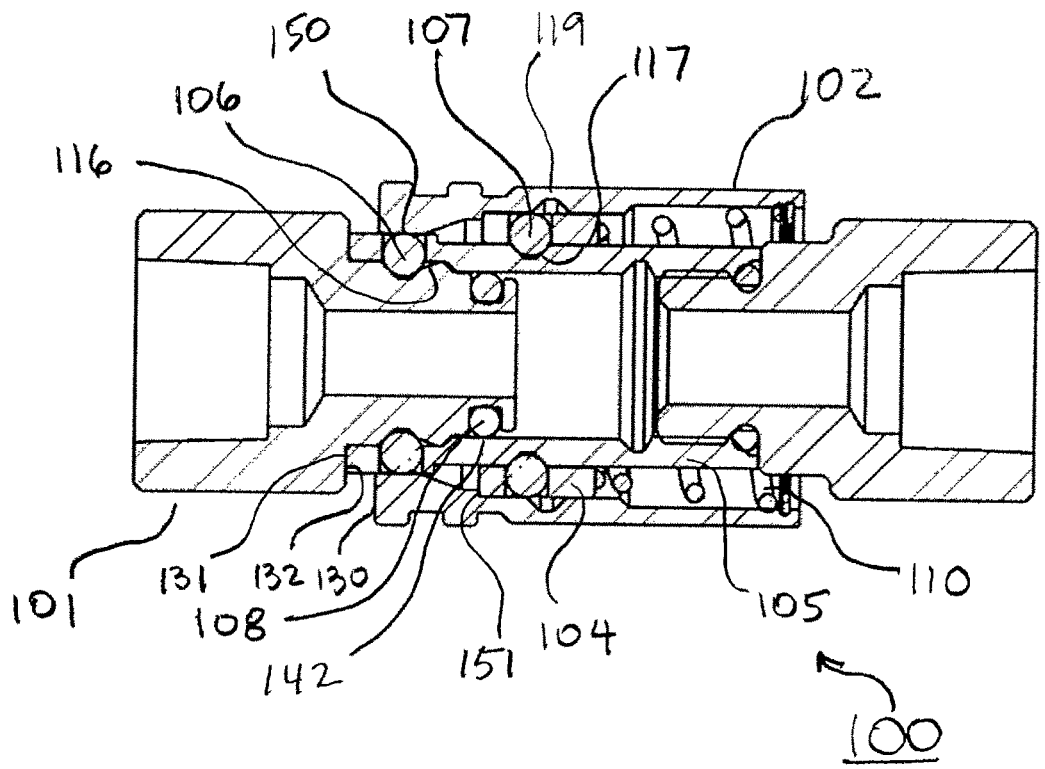
FIG. 5 is a cross-sectional side view of the quick coupling of FIG. 6, taken along the line 5-5 of FIG. 6.

FIG. 5 shows a sectional view of the connected quick coupling 100. As stated above, collar 102 moves automatically from the position shown in FIG. 4 to the locked position shown here. This occurs as detent balls 107 move into socket recess 117 and the expansion force of spring 110 pushes collar 102 away from shuttle 104. Collar 102 is automatically caused to slide back until collar shoulder 151 hits shuttle 104. Shuttle 104 is prevented from moving relative to female socket 105 in this the locked position as detent balls 107 are in socket recess 117. The automatic movement of collar 102 into the locked position enables the quick coupling connected state to be achieved by simply pushing the male plug 101 into female socket 105 and therefore a true one-handed connection operation is achieved.

The terms 'automatic' and 'automatically' are used to differentiate the manual pushing of male plug 101 into female socket 105 from the final toggling sliding motion of collar 102 into the locked position. To connect quick coupling 100, plug 101 is manually pushed into socket 105. As this is done, plug shoulder encounters collar face 130 and pushes collar 102 back. As plug 101 nears the connected position in relation to socket 105, collar 102 reaches the point where 'automatic' motion occurs as described above. The manual motion of pushing male plug 101 into female socket 105 stops as plug shoulder 131 hits socket face 132. Collar 102 continues to slide back along socket 105 of its own accord 'automatically' until stopping in the locked position.

Figure 6:
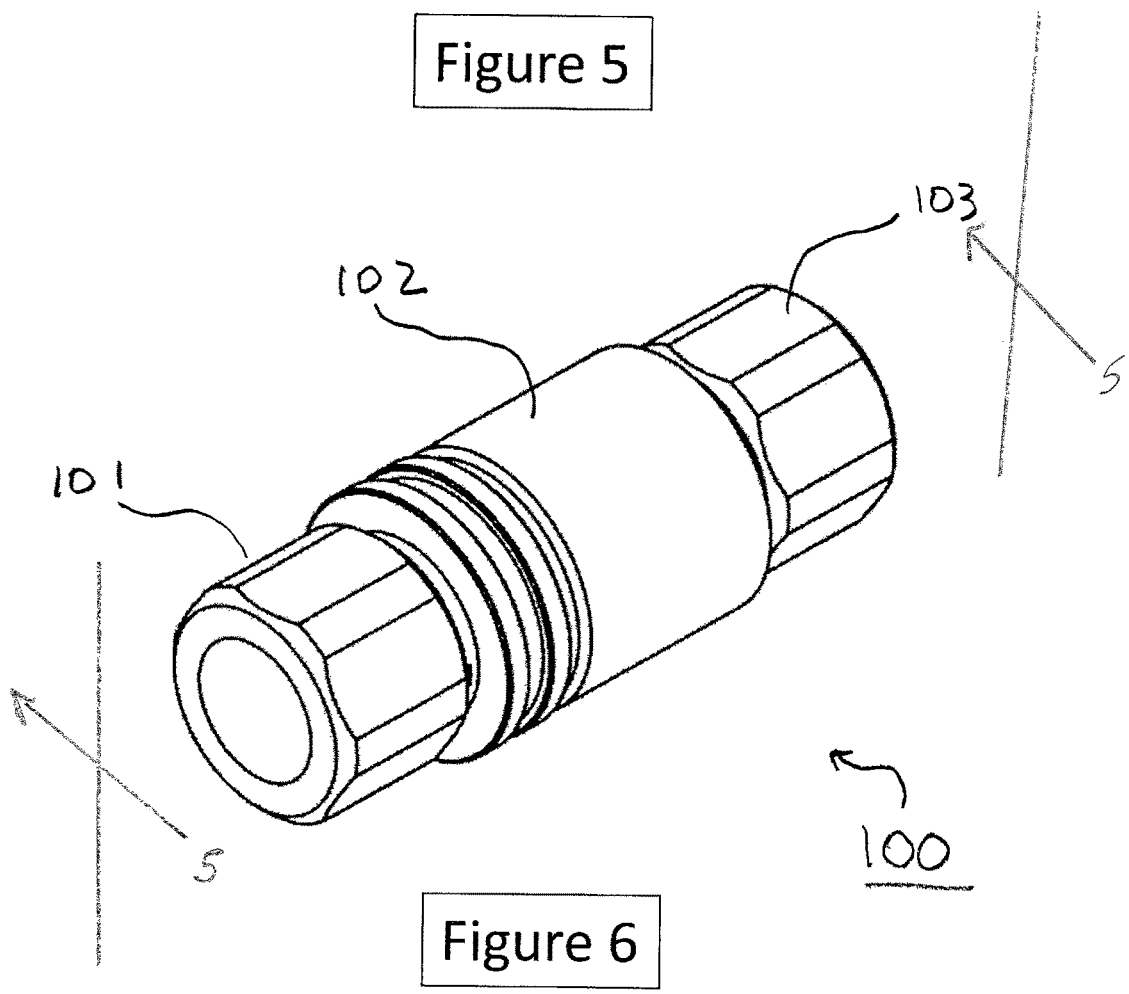
FIG. 6 is a perspective view of the quick connect/disconnect quick coupling in the connected or closed and locked state.

In the locked position, collar surface 150 prevents balls 106 from moving out of plug recess 115. Detent balls 106, engaged with both the male plug 101 and female socket 105, lock the male plug 101 into female socket 105. FIG. 6 shows a perspective view of the connected quick coupling 100. It will be seen that this locked position or connected state is stable and that the quick coupling will remain connected until the collar is manually manipulated to effect disconnection.

Quick coupling 100 can be disconnected by simply pulling collar 102 toward male plug 101 while the female socket 105 (and socket cap 103) is held stationary, typically by action of the attached conduit, so that only one hand is needed to effect disconnection. Referring to FIG. 4, as collar 102 is pulled forward, detent balls 107 move out of socket recess 117 and into collar recess 119. Face 130 of collar 102 now encounters plug shoulder 131 and pushes male plug 101 out of female socket 105. As male plug 101 is pushed out, detent balls 106 move out of male plug recess 115 and up plug ramp 116. When collar 102 reaches the position shown in FIG. 3, the male plug 101 is free to come out of female socket 105. The outward motion of collar 102 tends to pop male plug 101 out into the hand of the user with an audible click.

As can be seen, quick coupling 100 achieves the design goals of one-handed push-to-connect and one-handed pull-to-disconnect operation. In both states the operation is accompanied by audible, tactile and visual feedback communicating successful completion to the user. Importantly, quick coupling 100 achieves this goal with a simple design having only one energizing spring and one dynamic seal. Additionally, the male plug 101 is a single part (not including the O-ring) that can be readily installed on a number of devices for connection into a single female supply component.

It will be understood that while internal valves or poppets are not shown in quick coupling 100, persons having skill in the art will understand that these parts and their functions are well known and can readily be added to quick coupling 100 without affecting the novel aspects of the present invention.

The quick coupling 100 of the present invention can be used for vacuum and also high pressure fluid applications such as hydraulic, pneumatic and water lines. The inventive quick coupling can also have utility in other devices such as electrical connectors (e.g., single- or multiple-conductor), power take-offs and tool holders (e.g., for use with drill bits, end mills, surgical implements, hand tools, etc.). In power take-offs and tool holders the inventive quick coupling can be readily configured to transmit torque by having rotational locking features such as splines or keyways. Other potential applications will be apparent to those skilled in the art.

The information disclosed herein is not intended to be exhaustive or to limit the present invention to the precise forms disclosed herein. Although specific embodiments are disclosed herein for illustrative purposes, various equivalent modifications are possible without deviating from the present invention, as those of ordinary skill in the relevant art will recognize.

What is claimed is:

1. A push-to-connect and pull-to-disconnect quick coupling comprising:
    a) a first detent and a second detent;
    b) a female socket having an open end, a female socket recess to accept the first detent and female socket holes to contain the second detent;
    c) a shuttle slidable along the outside of the socket, said shuttle having shuttle detent holes to contain the first detent;
    d) a collar slidable along the outside of both the female socket and shuttle, the collar having a first recess for the first detent and a second recess for the second detent;
    e) a spring compressed between the collar and the shuttle;
    f) a male plug insertable into the open end of the female socket, said male plug having a male plug recess for the second detent;
    wherein:
       a stable connected state is established when the plug is inserted into the female socket and the collar, initially pushed by the male plug, automatically slides to a locked position;
       a stable disconnected state is reached by manually pulling the collar toward the open end of the socket; and
       the spring maintains both the stable disconnected state and the stable connected state.

2. The quick coupling of claim 1 wherein the male plug includes an O-ring.

3. The quick coupling of claim 1 wherein the spring maintains the stable connected state by exerting a spring force that pushes the collar away from the shuttle, constraining the first detent between the female socket recess and the shuttle detent holes, and locking the shuttle to the female socket.

4. The quick coupling of claim 1 wherein, in the stable connected state, the male plug is locked into the female socket as the second detent is constrained within the male plug recess and the female socket holes.

5. The quick coupling of claim 1, wherein the spring maintains the stable disconnected state by exerting a spring force that wedges the first detent between the first recess and the female socket.

6. The quick coupling of claim 1, when the quick coupling is in the stable disconnected state the female socket is separate from the male plug and the collar remains around the female socket.

* * * * *